(12) United States Patent
Leffew et al.

(10) Patent No.: US 6,409,491 B1
(45) Date of Patent: Jun. 25, 2002

(54) EXTRUSION DIE ASSEMBLY

(75) Inventors: Kenneth Wayne Leffew, Kennett Square, PA (US); David Peter Rule, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/775,452

(22) Filed: Feb. 2, 2001

Related U.S. Application Data

(63) Continuation of application No. 09/295,971, filed on Apr. 21, 1999, now abandoned.
(60) Provisional application No. 60/082,720, filed on Apr. 23, 1998.

(51) Int. Cl.[7] .............................. B29B 9/06; B29C 47/86
(52) U.S. Cl. .................... 425/67; 425/144; 425/313; 425/378.2; 425/379.1
(58) Field of Search .......................... 425/67, 144, 313, 425/316, 378.2, 379.1, DIG. 230

(56) References Cited

U.S. PATENT DOCUMENTS

| | | | |
|---|---|---|---|
| 3,521,325 A | 7/1970 | Schippers | |
| 3,775,035 A | 11/1973 | Scotto et al. | |
| 3,792,950 A | 2/1974 | Cuff | |
| 3,819,777 A | 6/1974 | Vermeerbergen | |
| 4,184,832 A | 1/1980 | Cuff | |
| 4,300,877 A | 11/1981 | Andersen | |
| 4,421,470 A | 12/1983 | Nakamura | |
| 4,564,350 A | 1/1986 | Holmes et al. | |
| 4,764,100 A | 8/1988 | Lambertus | |
| 4,830,595 A | 5/1989 | Bentivoglio et al. | |
| 5,192,543 A | 3/1993 | Irvin et al. | |
| 5,215,763 A | 6/1993 | Mattera | |
| 6,220,847 B1 * | 4/2001 | Yoshida et al. | 452/144 |

* cited by examiner

*Primary Examiner*—Nam Nguyen
*Assistant Examiner*—Joseph Leyson

(57) ABSTRACT

Disclosed is an improved extrusion die assembly for controlling the flow of polymer in a melt extrusion process. The die assembly is useful for extruding low molecular weight polymer melts.

6 Claims, 1 Drawing Sheet

EXTRUSION DIE ASSEMBLY

This application is a continuation of Ser. No. 09/295,971, now abandoned, and claims priority under 35 USC 119(e) of U.S. Provisional Application No. 60/082,720, filed on Apr. 23, 1998.

FIELD OF THE INVENTION

Disclosed is an extrusion die assembly useful for continuously controlling the flow of molten polymer, thereby facilitating the process for extruding low molecular weight polymer melts.

TECHNICAL BACKGROUND OF THE INVENTION

This invention relates to the manufacture and processing of polymer in molten form, i.e. liquid or semi-liquid, where the polymer is extruded through a nozzle then is cut into discrete pieces for further processing. In conventional polymer melt cutting, the melt is distributed to a plurality of orifices drilled radially in a die plate. The plate is usually heated with a combination of band heaters and cartridge heaters to keep the polymer flowing and to avoid frictional drag on the polymer passing through the die plate and to prevent solidification prior to cutting. This device works well with high molecular weight polymers because, as individual holes start to plug due to local freezing of the polymer from exposure to the liquid sweeping the cut particles from the face of the die plate, increased pressure is generated upstream of the die plate which tends to clear frozen polymer from the plugging hole(s). In melt cutting low molecular weight polymers, the same freezing phenomenon occurs, but, because of the low melt viscosity, sufficient pressure to clear frozen material from the plugged hole(s) is not generated upstream of the die plate. Subsequently, additional holes begin to freeze off completely. This freezing process continues until a small number of holes remain open to polymer flow. This, of course, reduces the efficiency of the process and results in poor cut quality and inconsistency in particle size.

Various references have addressed the field of melt cutting polymer and other extruded matter of high viscosity. However, none of the below references has specifically addressed the problems of controlling the flow of lower viscosity materials during a melt cutting operation.

Schippers, U.S. Pat. No. 3,521,325 discloses an apparatus wherein a circular nozzle plate is surrounded on the outer circumferential surface by an induction coil within a housing—an alternating current is applied to the induction coils.

Nakamura, U.S. Pat. No. 4,421,470 describes a die having holes which are interspersed by heaters so the die does not cool down when cooling water is forcibly jetted against the die surface as molten resin is extruded.

Mattera, U.S. Pat. No. 5,215,763 discloses apparatus in which three band heaters are mounted around or within a die plate; sufficient heat is produced to maintain the polymer at optimum temperature and viscosity for extrusion.

In Irvin, U.S. Pat. No. 5,192,543 a heated die plate for making extruded pasta shapes can be modified in any practical manner to be used with six core heaters (100–400 watts) controlled by a thermostat. This patent also discloses that each profile may be heated individually by supplying heat to each hole, e.g., through resistance wires.

In Scotto, U.S. Pat. No. 3,775,035, thermoplastic material is extruded through a die having independently controllable heaters around the die—temperature is varied based on measurement of the thickness of the webs—die has tubular orifice; tubular extrusion is expanded by air under pressure and a knife splits the tube longitudinally to form two sheets—the heat applied is non-uniform, and is applied circumferentially around the die.

Bentivoglio, U.S. Pat. No. 4,830,595 describes die lip heaters that heat just the surface of an extruded plastic film (tubular shape). A ring of heat conductive material is positioned at the lip and is heated by coils of electrical resistance wires.

Vermeerbergen, U.S. Pat. No. 3,819,777 describes temperature control of a multiple-head extruder based on pressure readings. Electrical resistance heaters, extrusion heads, and cooling means are also disclosed.

SUMMARY OF THE INVENTION

Disclosed is an improved extrusion die assembly for extruding polymer melts, comprising:
  (a) a plurality of extrusion barrels, each barrel comprising an inlet end, an outlet end, and an interior cavity, the interior cavity containing polymer melt which is conveyed from the inlet end to the outlet end;
  (b) a plurality of heaters, each heater having a hollow, cylindrical shaped interior, and each heater containing a corresponding extrusion barrel within the interior, such that the corresponding extrusion barrel is heated to a predetermined temperature;
  (c) a die plate, having an outer die face, and a plurality of die plate cavities, each of the die plate cavities forming a housing for supporting one of the plurality of extrusion barrels and heaters, each extrusion barrel and corresponding heater disposed within a corresponding die plate cavity, and each of the die plate cavities having an air gap between the heater and the die plate cavity inner surface;
  (d) a plurality of devices for the direct or indirect measurement of polymer melt flow, each flow measuring device disposed in a corresponding extrusion barrel outlet in contact with the polymer melt at a location immediately interior of the extrusion barrel outlet; and
  (e) at least one controller taking signals from said flow measuring devices and directing one or more of the plurality of heaters to supply heat as needed to the extrusion barrel outlets to maintain preselected temperatures.

Various other embodiments are taught herein.

DETAILED DESCRIPTION OF THE INVENTION

Figure 1:
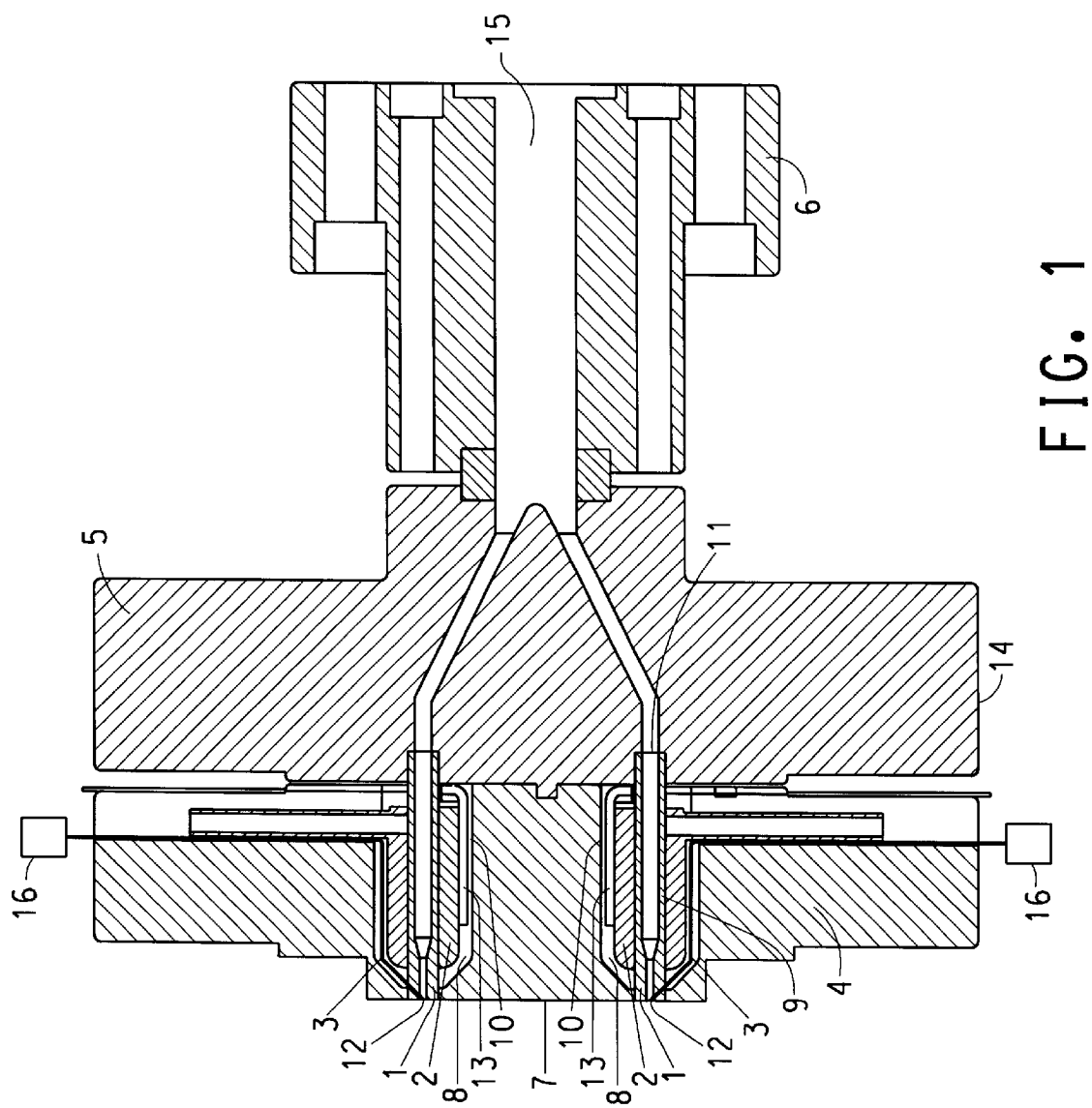
FIG. 1 is a diagram of an extruder die.

In FIG. 1, a specific embodiment of the present invention is described. In FIG. 1, the device used for the direct or indirect measure of polymer melt flow is a thermocouple (3).

In the present apparatus, low molecular weight polymer flows from the extruder (not shown) into the extrusion die assembly (14) through a single polymer passage (15) in the extruder adapter (6) and is radially distributed to individual polymer extrusion barrels (1), each possessing an extrusion barrel inlet (11), outlet (12) and interior cavity (9). Each extrusion barrel has a heater (2) press fit on the outside with the thermocouple (3) which senses the polymer temperature at the extrusion barrel outlet (12).

Each extrusion barrel and associated heater is positioned within a die plate cavity (10). Each of the die plate cavities forms a housing for supporting one of the plurality of extrusion barrels and heaters, each extrusion barrel and corresponding heater disposed within a corresponding die plate cavity, and each of the die plate cavities has an air gap (8) between the heater and the die plate cavity inner surface.

As the polymer begins to freeze and cool down on the walls of any one of the extrusion barrels, the thermocouple senses the drop in temperature and signals the controller (16) to supply heat to the corresponding heater, thereby melting the polymer on the walls and allowing flow to be maintained. The extrusion die assembly is heated with band heaters (not shown) around the die plate (4) and the back flange (5) and cartridge heaters (not shown) in the die plate (4).

The polymer, upon exiting the extrusion barrel outlet, is optionally cut as it exits the extrusion die assembly by a rotary cutter (not shown) brought into contact with the die plate face (7).

The device of the present invention is useful in the processing of polymers, with specific application to low viscosity polymer melts. By low viscosity polymer is meant a material that has a melt viscosity at processing temperatures of less than 100 poise.

Suitable means for the direct or indirect measurement of polymer melt flow in the individual extrusion barrel outlets, in addition to the thermocouple illustrated above, include optical measurements, for example measurements of opacity or refractive index; temperature measurements, for example by the use temperature sensing means, other than thermocouples; pressure drop measurements across each of the individual outlets; or changes in the physical properties of the polymer melt as it solidifies or approaches solidification.

The device of the present invention is preferably used with the die face immersed in a cooling liquid. The liquid is chosen to be non-reactive with the material being extruded. Depending on the nature of the polymeric material, the cooling liquid may be water. The apparatus can include a means, i.e. an air tube (13) for supplying a cooling air stream to each air gap (8) to provide cooling to the individual extrusion barrels, as needed to regulate temperature.

The low molecular weight polymers suitable for use in the present apparatus are selected from synthetic polymers. Representative polymers for which the present apparatus is useful are illustrated by, but not limited to, polyesters, polyamides, polyarylates, polyolefins, polyacrylates and methacrylates.

When the apparatus of the present invention is used with polyesters, it can be used to carry out the thermal shock crystallization process described in U.S. Pat. No. 5,540,868, which is hereby incorporated by reference.

An advantage for the use of thermocouples as the direct or indirect means of flow detection lies in the fact that thermocouples are inexpensive and require little maintenance.

What is claimed is:

1. An extrusion die assembly for extruding polymer melts comprising:

(a) a plurality of extrusion barrels, each barrel comprising an inlet end, an outlet end, and an interior cavity, the interior cavity containing polymer melt which is conveyed from the inlet end to the outlet end;

(b) a plurality of heaters, each heater having a hollow, cylindrical shaped interior, and each heater containing a corresponding extrusion barrel within the interior, such that the corresponding extrusion barrel is heated to a predetermined temperature;

(c) a die plate, having an outer die face, and a plurality of die plate cavities, each of the die plate cavities forming a housing for supporting one of the plurality of extrusion barrels and heaters, each extrusion barrel and corresponding heater disposed within a corresponding die plate cavity, and each of the die plate cavities having an air gap between the heater and a die plate cavity inner surface;

(d) a plurality of devices for the direct or indirect measurement of polymer melt flow, each flow measuring device disposed in a corresponding extrusion barrel outlet in contact with the polymer melt at a location immediately interior of the extrusion barrel outlet; and (e) at least one controller taking signals from said flow measuring devices and directing one or more of the plurality of heaters to supply heat as needed to the extrusion barrel outlets to maintain preselected temperatures.

2. The extrusion die assembly of claim 1 further comprising a means for supplying a cooling air stream to each air gap to provide cooling to the individual extrusion barrels, as needed, to regulate temperature.

3. The extrusion die assembly of claim 1 further comprising the outer die face being immersed in a liquid.

4. The extrusion die assembly of claim 1 wherein the devices for the direct or indirect measurement of flow are temperature sensors.

5. The extrusion die assembly of claim 4 wherein the devices for the direct or indirect measurement of flow are thermocouples.

6. The extrusion die assembly of claim 1 further comprising a cutter in contact with the outer die face for cutting polymer melt strands into pellets.

* * * * *